O. STROMBORG.
TRAP NEST.
APPLICATION FILED JAN. 29, 1920.
1,396,386.
Patented Nov. 8, 1921.
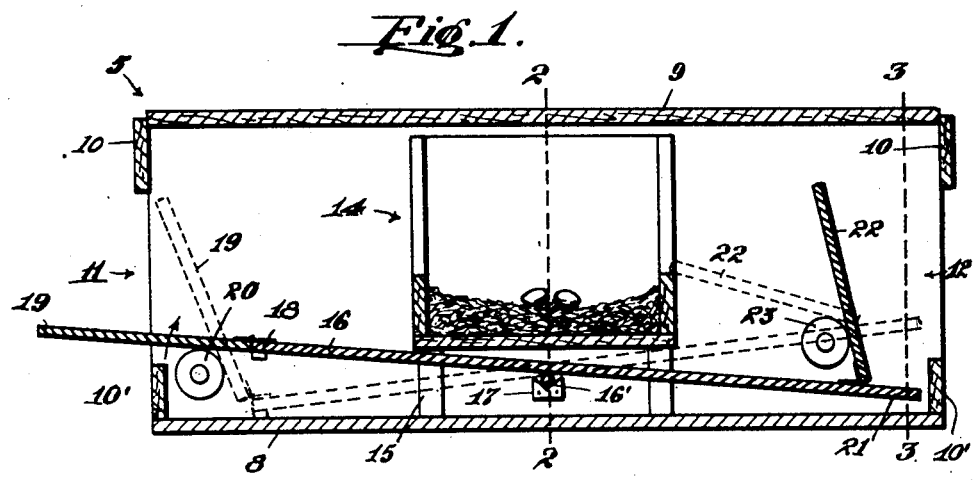
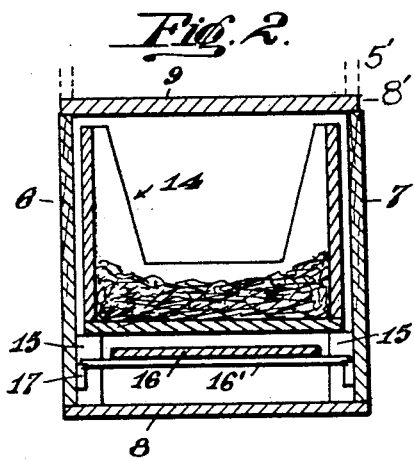
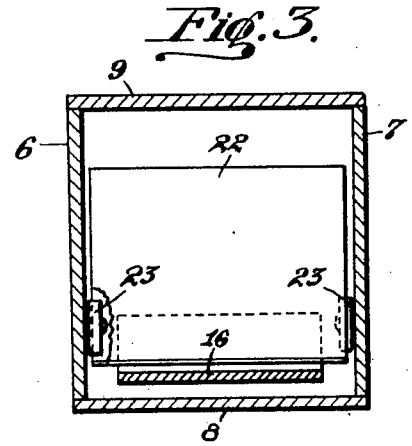
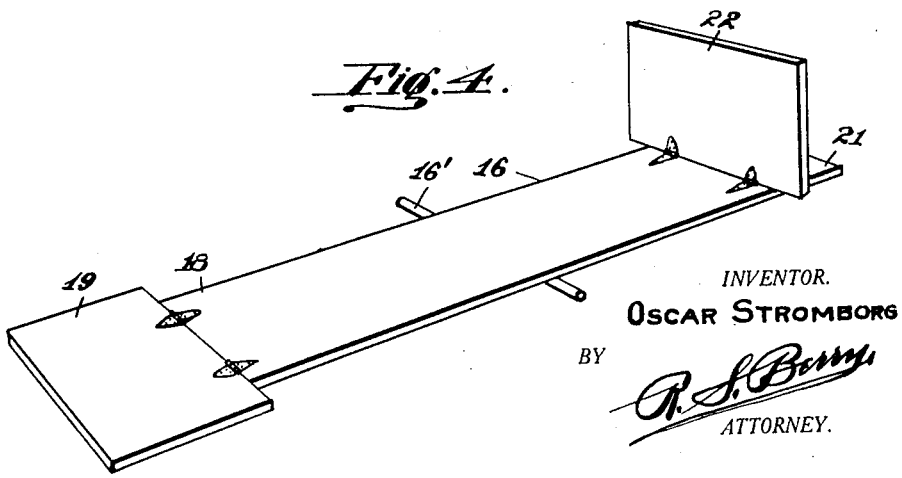
INVENTOR.
Oscar Stromborg
BY
R. S. Berry
ATTORNEY.

UNITED STATES PATENT OFFICE.

OSCAR STROMBORG, OF LOS ANGELES, CALIFORNIA.

TRAP-NEST.

1,396,386.  Specification of Letters Patent.  Patented Nov. 8, 1921.

Application filed January 29, 1920. Serial No. 354,944.

*To all whom it may concern:*

Be it known that I, OSCAR STROMBORG, a citizen of the United States, residing at Los Angeles, in the county of Los Angeles and State of California, have invented new and useful Improvements in Trap-Nests, of which the following is a specification.

This invention relates to a trap-nest and particularly pertains to a device especially adapted for use in hens' nests for aiding in the separation of laying from non-laying hens.

It is the object of this invention to provide a trap-nest which is so designed as not to imprison the nesting fowl therein and to permit free egress from the nest but which will prevent ingress to the nest during such time that it may be occupied.

Another object is to provide a nest having opposed inlet and outlet openings and provided with closures for said openings so mounted and arranged relative to each other that when one closure is open the other will be closed, and embodying means operable by a fowl for closing the inlet closure after the fowl has entered the nest and for opening same on the hen's departure from the nest and whereby the exit closure will be closed to prevent return of the fowl to the nest.

A further object is to provide a trap nest of the above character which is simple in construction and reliable in operation and in which the various parts may be readily assembled and also quickly separated for cleaning and disinfecting purposes.

Other objects will appear hereinafter.

The invention is illustrated in the accompanying drawings, in which:

Figure 1 is a view of the trap-nest as seen in longitudinal vertical section.

Fig. 2 is a view in transverse vertical section as seen on the line 2—2 of Fig. 1.

Fig. 3 is a view in transverse vertical section as seen on the line 3—3 of Fig. 1.

Fig. 4 is a detail in perspective illustrating the closures and their operative connection.

More specifically, 5 indicates a box like frame embodying side walls 6 and 7, a bottom wall 8, and a top wall 9, of any suitable construction. The ends of the frame are designed to be open to permit the passage of a fowl therethrough but may be provided with top and bottom transverse cleats 10 and 10' for stiffening purposes and for determining the ingress and egress openings 11 and 12 at the ends of the frame. The walls 6, 7, 8 and 9 are here shown as comprising continuous panels but may be formed of slats or otherwise suitably constructed, and if desired, the top panel 9 may embody the bottom wall 8' of a superimposed frame 5' as where the nests are stacked in tiers as indicated in dotted lines in Fig. 2. In some instances the bottom wall 8 may be formed by the ground or any other surface and is not necessarily a part of the frame.

Arranged within the frame intermediate of and spaced from its ends is a nest box 14, which may be of any suitable construction and opening on its opposite sides toward the ends of the frame. This nest box is supported upon cleats 15 or other suitable mountings to position it in spaced relation to the bottom wall 8. Extending lengthwise of the frame and projecting beneath the nest box 14 is a rocker panel 16 supported upon a pivotal mounting of any suitable construction, here shown as comprising a trunnion bar 16' mounted on the panel and projecting beyond the side edges thereof into pivotal engagement with brackets 17 on the side walls 6 and 7, but this pivotal connection may be of any appropriate construction. One end 18 of the rocker panel terminates within the frame a short distance from the ingress opening 11, and hinged to swing vertically on the end 18 is a closure panel 19 adapted to be disposed in continuation of the length of the rocker panel and to project through the ingress opening, and mounted in the frame to engage the under side of the closure panel 19 adjacent to its hinged connection with the rocker panel are projections 20 which are here shown as comprising rollers and which serve as a means for elevating the closure panel on depression of the end 18 of the rocker panel, as will be later described.

Hinged to swing inwardly and upwardly adjacent to the end 21 of the rocker panel is a closure panel 22 for closing the egress opening 12, which closure panel bears at its edges adjacent to its connection to the rocker panel on projections 23 in the frame, here shown as consisting of rollers and which projections serve on rocking of the rocker panel to control raising and lowering of the closure panel. This closure panel is of such length that when the end 21 of the rocker panel is in an elevated position, the outer end of the closure panel will abut against the nest box or be positioned adjacent thereto to form a platform over which the hen may pass on leaving the nest.

In the operation of the invention, the nest is preferably arranged to form a passage between adjacent inclosures and in setting the nest, the rocker panel is positioned with the end 18 in an uppermost position, as indicated in full lines in Fig. 1, with the closure panel 19 extending through the ingress opening 11 and with the closure panel 22 extending upwardly to block the egress opening 12. The rocker panel with the closure panels connected to the ends thereof is designed to be practically balanced on its pivotal mounting so that it will normally be disposed in the position shown in full lines in Fig. 1.

The hen in seeking the nest, enters the ingress opening 11 on the extended closure panel 19 and on entering the box and passing beyond the projections 20, her weight will act to depress the end 18 of the rocker panel, thereby causing the closure panel 19 to assume an elevated position and block the ingress opening to prevent retreat of the hen and also prevent other fowls from entering the nest. The hen may then pass from the rocker panel 15 to the nest proper. This operation of the rocker panel will cause the egress closure panel 22 to move downwardly on upward movement of the end 21 of the rocker panel and to assume a position as indicated in dotted lines in Fig. 1. On leaving the nest, the hen passes over the lowered closure panel 22 and on stepping upon the outer end 21 of the rocker panel causes the latter to move downwardly and to restore the closure panels 19 and 22 in their normal position; the hen being then free to leave the nest through the egress opening 12 and prevented from returning to the nest through the egress opening. The nest is thus automatically set in readiness for another operation and, therefore, does not require an attendant.

A particular advantage derived by the construction here shown resides in the fact that the hen is at no time imprisoned in the nest but is free to leave the nest at any time. The nest box is designed to be detachably mounted in the box frame as is the rocker panel so that these elements may be readily removed for cleansing and disinfecting purposes.

While I have shown and described a specific embodiment of my invention, I do not restrict myself to the exact details of construction shown, but may avail myself of such modifications in construction as may come within the scope of the appended claims without departing from the spirit and scope thereof.

I claim:

1. In a trap-nest, an open ended frame, a nest intermediate of and spaced from the ends of said frame, a rocker panel pivoted in said frame to extend beyond the opposite sides of said nest toward the open ends of the frame, a closure panel hinged on each end of said rocker panel to swing vertically, and means engageable with said closure panels for operating same on rocking of the rocker panel to alternately move said closure panels to their open and closed positions.

2. In a trap nest, a frame having an ingress opening at one end and an egress opening at its opposite end, a rocker panel extending lengthwise of said frame and pivoted intermediate the ends thereof, a closure panel hinged to one end of said rocker panel and adapted to extend in continuation thereof through the ingress opening when the end of the rocker panel carrying said closure panel is in an elevated position, means engageable with said closure panel operative to effect upwardly swinging movement of said closure panel on depression of the end of the rocker panel adjacent thereto, a closure panel hinged on said rocker panel adapted to close the egress opening, and means engageable with said last named closure panel operable to effect movement of said closure panel on depression of the end of the rocker panel adjacent thereto.

3. In a trap nest, a frame having an ingress opening at one end and an egress opening at its opposite end, a rocker panel extending lengthwise of said frame, a closure panel hinged on each end of said rocker panel, and means engageable with said closure panels operable on rocking of the rocker panel for alternately opening and closing the ingress and egress openings.

4. In a trap nest, a frame open at its ends to form an ingress and an egress opening, a nest in said frame arranged between and spaced from said ingress and egress openings, a panel pivoted beneath said nest to rock vertically and extending on either side thereof toward said ingress and egress openings, a closure panel hinged on said pivoted panel to swing vertically and adapted to extend in continuation thereof through the ingress opening, a second closure panel hinged adjacent to the opposite end of said pivoted panel to swing vertically and adapted to extend toward said nest, and projections on said frame engageable with said closure panels operable on depression of either end of said pivoted panel to dispose the closure panel engaged thereby in an elevated or closing position.

In testimony whereof I have hereunto affixed my signature this 14th day of January, 1920.

OSCAR STROMBORG.